United States Patent [19]

Pusch et al.

[11] Patent Number: 4,472,164
[45] Date of Patent: Sep. 18, 1984

[54] SPROCKET WHEEL

[75] Inventors: Allen A. Pusch; Russ J. Ewert, both of Calgary, Canada

[73] Assignee: Canadian Foremost, Ltd., Clagary, Canada

[21] Appl. No.: 258,080

[22] Filed: Apr. 27, 1981

[30] Foreign Application Priority Data

Apr. 28, 1980 [CA] Canada .................................. 350767

[51] Int. Cl.³ ........................ F16H 3/22; F16H 55/12; F16H 55/17; B62D 55/08
[52] U.S. Cl. ..................................... 474/161; 305/57; 74/DIG. 10; 74/448; 74/434; 474/901
[58] Field of Search ................... 305/57; 474/161, 901; 74/DIG. 10, 445, 439, 448, 443, 434, 431

[56] References Cited

U.S. PATENT DOCUMENTS

| | | | |
|---|---|---|---|
| 462,994 | 11/1891 | Pfetch | 474/161 X |
| 2,764,900 | 10/1956 | Warsmith | 74/434 |
| 3,113,805 | 12/1963 | Nodwell | 305/57 |
| 3,439,551 | 4/1969 | Militana | 74/448 |
| 3,461,737 | 8/1969 | Lukawich et al. | 74/443 |
| 3,483,766 | 12/1969 | Erickson | 305/57 |
| 3,504,562 | 4/1970 | Hirych | 474/161 |
| 3,916,708 | 11/1975 | Durand | 474/161 |
| 4,110,054 | 8/1978 | Moeller | 74/DIG. 10 |

FOREIGN PATENT DOCUMENTS

| | | |
|---|---|---|
| 504099 | 6/1945 | Canada . |
| 599820 | 6/1960 | Canada . |
| 667063 | 7/1963 | Canada . |
| 885346 | 1/1971 | Canada . |
| 865595 | 3/1971 | Canada . |
| 882542 | 10/1971 | Canada . |
| 918712 | 1/1973 | Canada . |
| 968012 | 5/1974 | Canada . |
| 975033 | 9/1975 | Canada . |
| 1005354 | 2/1977 | Canada . |
| 1024195 | 1/1978 | Canada . |
| 1407841 | 9/1975 | United Kingdom ................. 74/434 |
| 219957 | 3/1968 | U.S.S.R. ................................ 74/434 |

Primary Examiner—Lawrence J. Staab
Assistant Examiner—Michael D. Bednarek
Attorney, Agent, or Firm—Jones, Tullar & Cooper

[57] ABSTRACT

A sprocket wheel for a tracked vehicle, the sprocket wheel being in the form of an annular body having teeth integrally moulded of elastomeric material, the teeth including metal inserts moulded therein and providing track engaging surfaces in the inter-tooth valleys about the sprocket wheel.

14 Claims, 5 Drawing Figures

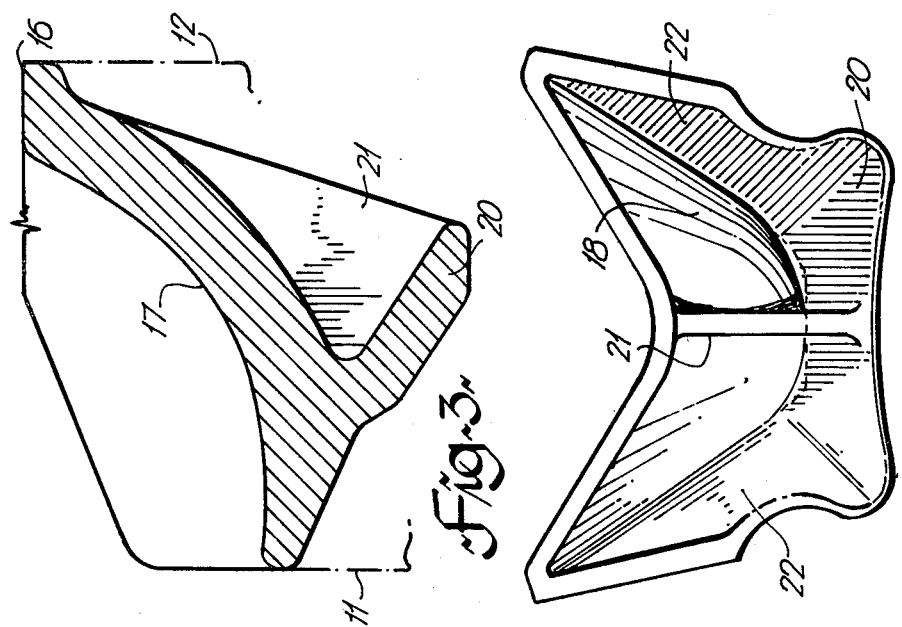
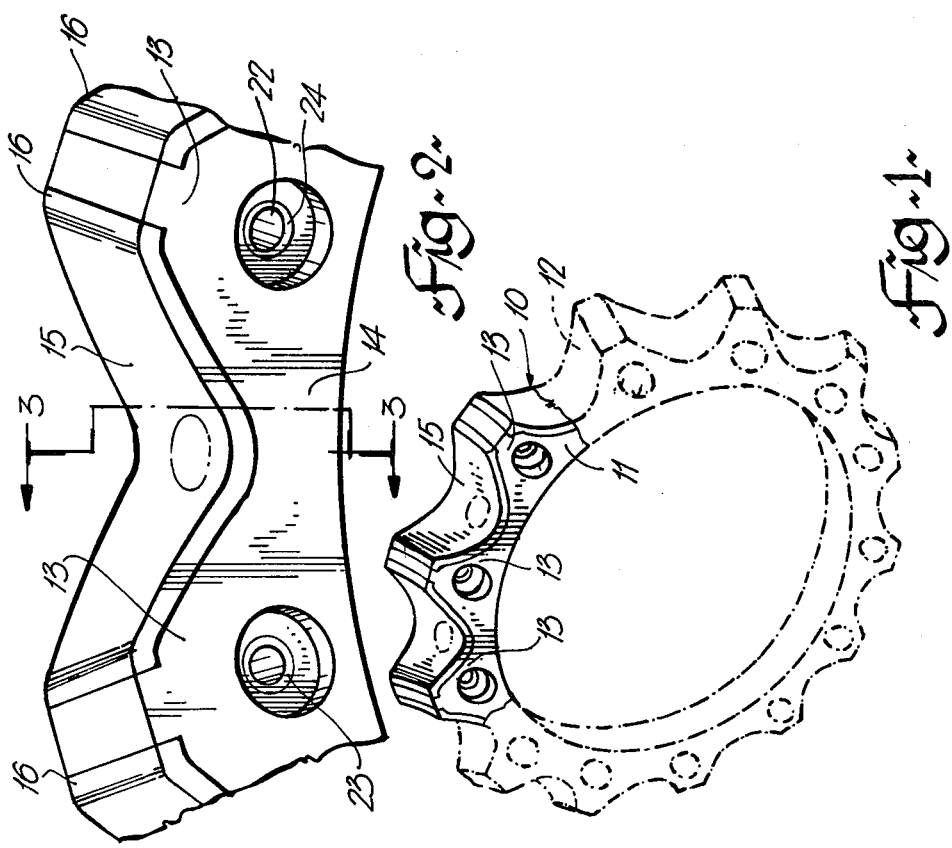

SPROCKET WHEEL

BACKGROUND OF THE INVENTION

This invention relates to a sprocket wheel of the type used on a tracked vehicle.

For a number of years drive sprockets for tracked vehicles have been made from resilient and rubber like materials, and in large commercial type vehicles solid polyurethane sprockets have in the main given good service. The polyurethane type sprockets have good wear characteristics and operate with low noise and vibration levels. It has recently become apparent that this type of sprocket is not adequate for operation in severe abrasive type soil conditions. For operation in such soil condition there has been manufactured a solid cast iron sprocket which has functioned well. Some of the disadvantages of the solid caset iron sprocket became more significant when attempts were made to provide such a sprocket for very large vehicles. Serious problems have been experienced in manufacturing and handling because of the extreme weight. The large diameter small cross-section cast sprocket is fragile and breakage rate is high. The cast iron sprocket and also the sprocket hub to which the sprocket wheel is attached require machining for proper fit, while machining was not necessary with the solid polyurethane sprocket. Warpage of the large sprocket can also render the high cost cast iron sprocket useless.

SUMMARY OF THE INVENTION

It is an object of the present invention to provide a sprocket wheel which is more economical to produce and handle than a solid cast iron sprocket but one which has good wear characteristics for operation in abrasive soil conditions.

According to one aspect of the present invention there is provided a sprocket wheel for a tracked vehicle including a unitary molded elastomeric body of generally annular configuration and having means for attachment to a hub member. Teeth are formed integrally with the body and project radially therefrom so as to provide track engaging surfaces therebetween. Inserts of high wear resistant material are moulded into the body for providing the track engaging surfaces.

According to another aspect of the present invention, there is provided a segment of a sprocket wheel having opposite end surfaces, the segment when mounted in end-to-end relation with other like segments form a complete sprocket wheel of generally annular configuration attachable to a hub member of a vehicle. The segment includes an arcuate-shaped, unitary moulded elastomeric body having teeth formed integrally with the body and projecting radially therefrom. Metal inserts are moulded into the body for providing track engaging surfaces between the teeth. Each opposite end surface is on a line cutting midway through one of the inserts.

In a specific embodiment of the invention, the body and teeth are moulded solid polyurethane and the inserts are preformed cast ductile iron.

BRIEF DESCRIPTION OF THE DRAWINGS

Referring now to the accompanying drawings which show an embodiment of the invention by way of an example:

FIG. 1 is a perspective view of a wheel sprocket;

FIG. 2 is a front view of a portion of the sprocket of FIG. 1 but on an enlarged scale;

FIG. 3 is a cross-sectional view of the insert only as viewed on line 3—3 of FIG. 2 and on yet a further enlarged scale;

FIG. 4 is a rear view of the insert shown in FIG. 3; and

DETAILED DESCRIPTION OF THE INVENTION

Figure 5:
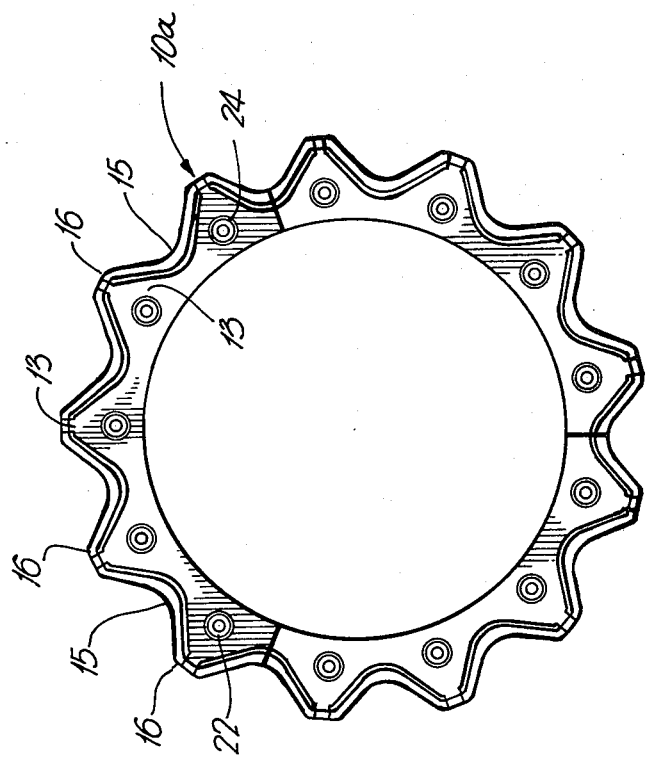
FIG. 5 is a front view of an alternative form of a sprocket according to the present invention.

In FIG. 1, the reference member 10 generally denotes a sprocket wheel in accordance with the present invention. The sprocket wheel 10 has an outer side surface 11 and an inner side surface 12. With the particular design shown in the drawings, the sprocket wheels would be mounted in pairs, fixed to a common hub member and with the inner side surfaces of the pair of sprocket wheels facing each other but spaced from one another.

The sprocket wheel 10 has teeth 13 projecting from a generally annular body 14. The profile of the teeth at the inner side of the sprocket wheel is larger than the profile at the outer side so that the undulating outer peripheral surface of the sprocket wheel slopes from the inner to the outer side thereof. A grouser bar engaging portion 15 of the outer peripheral surface is that portion extending between adjacent pairs of teeth which may be referred to as the inter-tooth valley. The grouser bar engaging portion between each adjacent pair of teeth is defined by an upper surface 17 of an insert 16 of high wear resistant material. The upper surface 17 slopes from the inner side of the sprocket to the outer side as does the entire outer peripheral surface of the sprocket wheel as described above, and as seen in transverse cross-section (FIG. 3) the slope includes a concave configuration which is most pronounced at the centre of the insert. In a cross-section of the insert taken on a radial plane of the sprocket wheel, the insert is generally of an open V-shape configuration. Adjacent inserts have their edges spaced so that the tooth material, which may be polyurethane, forms the tops of the teeth, the tooth material and inserts providing, however, a continuous smooth surface at the tops of the teeth.

Each insert includes a main body portion 18 which provides the upper surface 17 and below the main body portion 18, a lower flange 20 projects away from the outer side surface of the sprocket wheel. A vertical web 21 extends between the main body portion 18 and the flange 20 centrally of the insert. Additionally side flanges 22 join the end edges of the main body portion 18 to the lower flange 20.

The inserts are preferably formed of cast ductile iron, although other metals such as cast iron or cast steel in various alloys may be used. In a situation where weight is an important feature cast aluminum might also be used or alternatively, other compositions which have high wear resistant characteristics such as graphite fibers impregnated in fiberglass. The inserts are moulded into the sprocket wheel as the sprocket wheel including the body 14 and teeth 13 are moulded as an integral unit of elastomer, preferably polyurethane which provides a cushion-like body for bonding the inserts in the sprocket. The flanges 20 and 22 and web 21 serve to anchor the metal insert and enhance the mechanical bond in the unit. The flange and particularly the web 21 also serve to reinforce the main body portion of the insert.

The sprocket wheel 10 is secured to the hub member by way of a plurality of bolts passing through openings 23. The openings 23 may be provided with metal bushings 24 which provide liners extending for at least a part of the length of the openings. The bushings 24, like the inserts 16, are moulded in place at the time the elastomer body is being formed.

Taking into account the differences in density of polyurethane and cast iron, it can be calculated that a solid cast iron sprocket having the disadvantages described above, would have a weight which is more than six times that of a solid urethane sprocket wheel of the same size. A sprocket wheel manufactured in accordance with the present invention and utilizing cast iron inserts would have a weight of slightly less than three times that of a solid urethane sprocket. Although the sprocket wheel of the present invention is less than half the weight of a comparable cast iron sprocket wheel, it functions well in abrasive soil conditions because the grouser bar engaging surfaces of the sprocket wheel are metal, such as cast ductile iron. Because the polyurethane completely surrounds the insert a cushioning effect is achieved. The sprocket wheel of the present invention is considerable less fragile than a solid cast iron wheel and is not subject to warping. As in the case of solid polyurethane sprocket wheels, machining of the sprocket wheel and hub member is not necessary.

As an alternative to the complete annular sprocket wheel 10 described above, the present invention may be in the form of a segment 10a of a sprocket as indicated in FIG. 5. A complete sprocket wheel is thus formed from a plurality of segments, such as is shown in the example, secured on the hub in end-to-end relationship. The formation of the segment may be as described above for the entire sprocket with the high wear resistant inserts moulded in the elastomeric material. The abutment lines between the segments pass through the middle of the insert, the inserts providing sufficient strength at the joint so as to be self-supporting, which would not be possible in a sprocket of only polyurethane. By producing the separable segments, it is possible to replace a complete sprocket, a segment at a time, without removing the tracks and hubs of the vehicle.

It is apparent that alternative arrangements would be obvious to those skilled in the art without departing from the spirit of the invention as defined in the appending claims, the above embodiment having been illustrated as an example of the invention.

The embodiments of the invention in which an exclusive property or privilege is claimed are defined as follows:

1. A sprocket wheel for a tracked vehicle comprising:
  a unitary moulded solid urethane body of a generally annular configuration and having means for attachment to a hub member,
  a plurality of teeth projecting radially from said body, said teeth including:
  (i) a urethane base moulded as an integral part of said body; and
  (ii) a plurality of individual metal inserts moulded into the urethane body and each providing a grouser bar surface occupying an inter-tooth valley between each adjacent pair of teeth.

2. The sprocket wheel of claim 1, wherein said inserts and said teeth form a continuous, smooth peripheral surface for said sprocket wheel.

3. The sprocket wheel of claim 2, wherein each said insert is integrally moulded into said elastomer body to bond said inserts in said sprocket wheel.

4. The sprocket wheel of claim 3, wherein each said insert includes flange means to anchor said insert in said body and thereby enhance the mechanical bond therebetween.

5. The sprocket wheel of claim 4, wherein said upper surface and said flange form an insert that is generally V-shaped in cross-section, said upper surface generally sloping from an inner side to an outer side of said sprocket wheel.

6. The sprocket wheel of claim 5, wherein said upper surface includes a generally concave portion extending transversely across said insert.

7. A sprocket wheel as defined in claim 1, wherein, said sprocket wheel has an inner side surface and an outer side surface, said grouser bar engaging surface extending between said side surfaces.

8. A sprocket wheel as defined in claim 7, wherein the tooth profile of the sprocket wheel at the inner side surface is larger than the tooth profile of the outer side surface, at least a portion of the grouser bar engaging surface in each inter-tooth valley sloping from the inner to the outer side surface.

9. A sprocket wheel as defined in claim 8, wherein each insert in transverse cross-section has a main body portion sloping from said inner side surface to said outer side surface and providing a concave upper surface, and wherein each insert taken on a radial plane is of open V-shape cross-section.

10. A sprocket wheel as defined in claim 9, wherein, said insert has a flange portion extending back under said main body portion away from an edge at said outer side surface.

11. A sprocket wheel as defined in claim 1 or 7, wherein said inserts are formed of cast ductile iron.

12. A sprocket wheel as defined in claim 1 or 7, wherein said inserts are formed of cast iron, cast steel or cast aluminum.

13. A sprocket wheel for a tracked vehicle comprising a unitary moulded solid urethane body of a generally annular configuration and having means for attachment to a hub member, a plurality of teeth projecting radially from said body, said teeth including a urethane base moulded as an integral part of said body and metal inserts moulded into the urethane body and providing grouser bar engaging surfaces on said teeth, said sprocket wheel having an inner side surface and an outer side surface, said grouser bar engaging surface extending between said side surfaces, said grouser bar engaging surface being defined by each insert occupying the inter-tooth valley between each adjacent pair of teeth, said sprocket wheel having a tooth profile at the inner side surface thereof larger than the tooth profile at the outer side surface thereof, at least a portion of said grouser bar engaging surface in each inter-tooth valley sloping from the inner to the outer side surface, each insert in transverse cross section having a main body portion sloping from said inner side surface to said outer side surface and providing a concave upper surface, each insert taken on a radial plane being of open V-shape cross-section and having a flange portion extending back under the main body portion away from the edge at said outer side surface, said insert having a central vertical web extending between said main body portion and said flange.

14. A segment of a sprocket wheel having opposite end surfaces for abutment with end surfaces of other like segments to form a complete sprocket wheel of generally annular configuration for attachment to a hub member of a vehicle, said segment comprising a unitary moulded arcuate shaped elastomer body having teeth formed integrally with the body and projecting radially therefrom, and a plurality of individual metal inserts each being moulded into said body for providing track engaging surfaces between said teeth, each opposite end surface of said segment being on a line cutting midway through one of said inserts.

* * * * *